(12) United States Patent
Sarve et al.

(10) Patent No.: US 9,477,872 B2
(45) Date of Patent: Oct. 25, 2016

(54) GUIDED FINGERPRINT ENROLMENT

(71) Applicant: FINGERPRINT CARDS AB, Göteborg (SE)

(72) Inventors: Hamid Sarve, Göteborg (SE); David Tingdahl, Göteborg (SE); Carsten Juncker, Herlev (DK); Niels Mørch, Søborg (DK)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 14/952,169

(22) Filed: Nov. 25, 2015

(65) Prior Publication Data

US 2016/0180141 A1    Jun. 23, 2016

(30) Foreign Application Priority Data

Dec. 19, 2014    (SE) .................................... 1451598-5

(51) Int. Cl.
*G06K 9/00* (2006.01)
*G06K 9/03* (2006.01)
*G06T 7/00* (2006.01)

(52) U.S. Cl.
CPC ........... *G06K 9/00026* (2013.01); *G06K 9/001* (2013.01); *G06K 9/0008* (2013.01); *G06K 9/036* (2013.01); *G06T 7/0028* (2013.01)

(58) Field of Classification Search
CPC ........... G06K 9/00026; G06K 9/0008; G06K 9/001; G06K 9/036; G06T 7/0028
See application file for complete search history.

(56) References Cited

U.S. PATENT DOCUMENTS

| | | | |
|---|---|---|---|
| 5,828,773 A | 10/1998 | Setlak et al. | |
| 7,853,055 B2 * | 12/2010 | Machida | G06K 9/00899 382/124 |
| 8,913,802 B2 * | 12/2014 | Han | G06K 9/00013 382/100 |
| 2002/0141622 A1 | 10/2002 | Yamaguchi | |
| 2005/0129291 A1 * | 6/2005 | Boshra | G06K 9/00026 382/124 |
| 2010/0232659 A1 * | 9/2010 | Rahmes | G06K 9/00087 382/125 |
| 2010/0303311 A1 | 12/2010 | Shin et al. | |
| 2014/0003677 A1 | 1/2014 | Han et al. | |
| 2014/0003679 A1 | 1/2014 | Han et al. | |
| 2014/0003682 A1 * | 1/2014 | Vieta | G06K 9/00026 382/124 |
| 2016/0026840 A1 * | 1/2016 | Li | G06K 9/00013 348/77 |
| 2016/0180141 A1 * | 6/2016 | Sarve | G06K 9/00026 382/124 |

FOREIGN PATENT DOCUMENTS

EP    1645989 A2    4/2006
GB    2331613 A    5/1999

OTHER PUBLICATIONS

PCT International Search Report dated Apr. 6, 2016 for PCT International Application No. PCT/SE2015/051344, 6 pages.

* cited by examiner

*Primary Examiner* — Gregory M Desire
(74) *Attorney, Agent, or Firm* — Remarck Law Group PLC

(57) ABSTRACT

In a fingerprint sensing system, a determination is made of a center of attention, COA, point. The COA point is a point on a finger of a user that is likely to be in proximity of the center of a fingerprint image of the finger obtained by a fingerprint sensor. This COA determination is used in guiding the user in a fingerprint enrolment procedure.

14 Claims, 3 Drawing Sheets

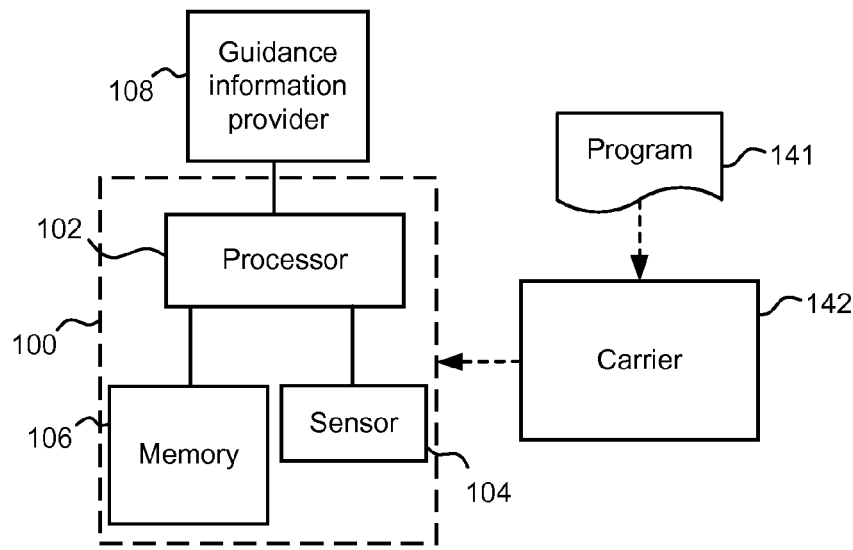
*Fig. 1a*
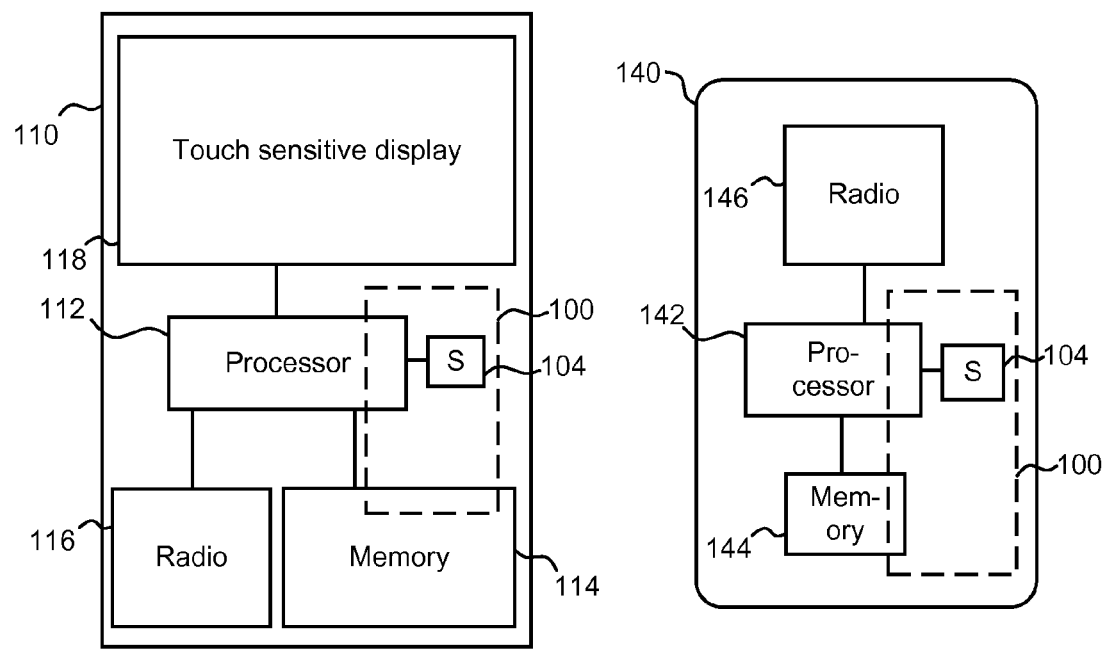
*Fig. 1b*  *Fig. 1c*

GUIDED FINGERPRINT ENROLMENT

CROSS-REFERENCE TO RELATED APPLICATIONS

This application claims the benefit of Swedish Patent Application No. 1451598-5, filed Dec. 19, 2014. The disclosure of the above application is incorporated herein by reference in its entirety.

TECHNICAL FIELD

Embodiments herein relate to methods and arrangements relating to enrolment of fingerprints in a fingerprint sensing system.

BACKGROUND

In the field of biometric sensing, the use of fingerprints has evolved to be one of the most widely used technologies. This fact can be illustrated and exemplified by considering the field of mobile communication technology, e.g. the use of intelligent mobile devices such as smartphones. In this field there is an increased demand for providing increased security for accessing the devices themselves and also for providing secure access to remote services such as banking services that are available via data communication networks.

In order to enable such secure access by way of fingerprint sensing, a user has to take part in a so-called enrolment procedure where information directly connected to a user's fingerprint is registered for later use in a verification procedure when actual access is to be determined. During such an enrolment procedure, the user is typically prompted to apply a finger to a fingerprint sensor several times until a complete fingerprint, or at least a large part of a fingerprint, has been recorded.

Examples of prior art fingerprint enrolment are described in US patent application publications 2014/0003677 and 2014/0003679. In the systems described in these publications, during the enrolment procedure, a user is provided with feedback in the form of information that tells the user which part of the fingerprint that is still to be recorded.

However, there are drawbacks with prior art enrolment procedures. For example, previous known enrolment methods, including the systems described in the publications cited above, typically apply generalized enrollment schemes aiming to enroll the same fingerprint area for all users, without taking into account what is feeling natural and convenient for the user who is to enroll a fingerprint. These approaches are thus sub-optimal as they, for some users, guide the users to enroll a part of their fingerprint which they will never use for subsequent verification procedures. Such prior art methods and systems typically suffer from a fairly large number of false rejections during verification procedures because a user by instinct might use another part of the fingerprint for verification than the part of the fingerprint that the user was instructed to use during the enrolment.

SUMMARY

In order to mitigate at least some of the drawbacks as discussed above, there is provided in a first aspect of embodiments herein a method in a fingerprint sensing system. The fingerprint sensing system comprises a fingerprint sensor and the method comprises a determination of a center of attention, COA, point. The COA point is a point on a finger of a user that is likely to be in a proximity of the center of a fingerprint image of the finger obtained by the sensor. This COA determination is followed by guiding the user in a fingerprint enrolment procedure, using the determined COA point for providing finger position guidance information to the user.

In other words, by making an initial estimation of the COA point for a given user and using that COA point as a reference point around which enrollment data is of interest during the subsequent guided fingerprint enrollment, the overall user experience of the fingerprint sensor is improved. This is the case, as the user will be using the part of the finger that feels natural for the user for both the enrolment and any subsequent verification procedure when the fingerprint is to be verified.

In various embodiments, the determination of the COA point comprises obtaining a first plurality of fingerprint images of the finger of the user from the fingerprint sensor. During the obtaining of the first plurality of fingerprint images, the first plurality of fingerprint images are stitched into a first two-dimensional stitched image. The COA point is determined by calculating a center of gravity point of the first stitched image and assigning the center of gravity point to the COA point. Furthermore, in these embodiments, the guiding of the user in the fingerprint enrolment procedure comprises obtaining a second plurality of fingerprint images of the finger of the user from the fingerprint sensor. During the obtaining of the second plurality of fingerprint images, the second plurality of fingerprint images are stitched into a second two-dimensional stitched image. During the obtaining and stitching of the second plurality of fingerprint images, a calculation is made of a desired position of the finger in relation to the sensor that, when a fingerprint image in the second plurality of fingerprint images is obtained of the finger at the desired position provides an amount of additional fingerprint area in the second stitched image in the proximity of the COA point that has a maximum value. Moreover, during the obtaining and stitching of the second plurality of fingerprint images, guidance information is provided for the user, where this guidance information is indicative of the calculated desired position.

The guiding of the user in the fingerprint enrolment procedure may in some embodiments comprise a calculation of an updated COA point by using the second stitched image. For example, a search can be made for a location of a singular point in the second stitched image and, if the search is positive, using this location of the singular point in the calculation of an updated COA point.

The amount of additional fingerprint area in the second stitched image may in some embodiments be determined in an algorithm that comprises calculation of a coverage score S:

$$S = \Sigma_{\forall x,y} G(\text{CoA}, \sigma) M(x,y)$$

where G is a Gaussian kernel, $\sigma$ is the standard deviation of the Gaussian and $M(x,y)$ is a binary value coverage mask corresponding to the second stitched image with x and y being the pixel position in the second stitched image, and where the enrolment procedure is terminated when a termination criterion based on S is reached.

In a second aspect there is provided a fingerprint sensing system that comprises a fingerprint sensor, a processor and a memory. The memory contains instructions executable by the processor whereby the processor is operative to control the fingerprint sensing system by determining a center of attention, COA, point, the COA point being a point on a finger of a user that is likely to be in a proximity of the center of a fingerprint image of the finger obtained by the sensor, and guiding the user in a fingerprint enrolment procedure, using the determined COA point for providing finger position guidance information to the user.

In further aspects there are provided a communication device comprising the fingerprint sensing system of the second aspect, a computer program, comprising instructions which, when executed on at least one processor in a fingerprint sensing system, cause the fingerprint sensing system to carry out the method according to the first aspect and, in a final aspect, a carrier comprising the computer program.

Effects and advantages of these further aspects correspond to those summarized above in connection with the first aspect.

BRIEF DESCRIPTION OF THE DRAWINGS

FIG. 1a schematically illustrates a block diagram of a fingerprint sensing system, FIG. 1b schematically illustrates a block diagram of a mobile communication device, FIG. 1c schematically illustrates a block diagram of a smart card.

DETAILED DESCRIPTION

Figure 2A:
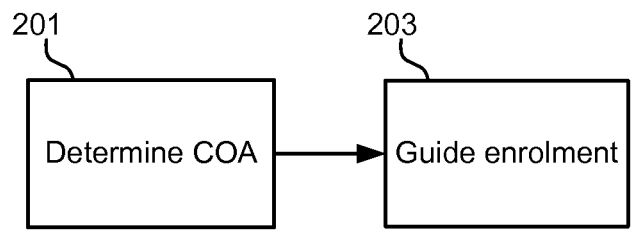
FIG. 2a is a flowchart of a method.

FIG. 1a illustrates schematically in the form of function blocks a fingerprint sensing system 100. The function blocks comprise a processor 102, a two-dimensional fingerprint sensor 104 and a memory 106, and the system 100 is in connection with a guidance information provider 108. The processor is operable to control the fingerprint sensing system 100 and it is connected to the memory 104, which comprises an appropriate computer program 141 comprising software instructions and data that enables the processor 102 to control the system 100 as will be exemplified below. With regard to the fingerprint sensor 104 it may be of any suitable type, such as optical, capacitive, ultrasonic etc., as the skilled person will realize. The fingerprint sensor 104 may comprise a square or rectangular shaped matrix of pixels, for example a capacitive sensor having a size of 208×80 pixels, each pixel having a resolution of 256 grey scales. The fingerprint sensor typically comprises a readout circuit (not shown in the drawings) allowing the image data, i.e. fingerprint data, to be read out to the processor 102 at various speeds.

The fingerprint sensing system 100 may comprise individual components as illustrated schematically in FIG. 1a and the system may also be implemented by way of combining functionalities of the processor 102 and the memory 106 in a single unit. It is also possible to have an implementation where the sensor 104 comprises the necessary processor and memory capabilities.

With regard to the guidance information provider 108, it is an arrangement that is capable of providing a feedback to a user when the user interacts with the fingerprint sensing system 100. Although feedback will be exemplified with visual output in the form of graphics in the following, it is to be noted that the feedback from the guidance information provider 108 may be an arrangement that is capable of providing sensory output that is any of visual, sound and touch.

FIG. 1b illustrates schematically in the form of function blocks a mobile communication device 110 such as a mobile phone, a smartphone, a tablet, a personal computer, a laptop computer or any similar type of device. The mobile communication device 110 comprises the functionalities of the fingerprint sensing system 100 of FIG. 1a including the sensor 104. The mobile communication device 110 comprises a processor 112, a memory 114, radio circuitry 116 and a touch sensitive display 118. As indicated in FIG. 1b, the fingerprint sensing system 100 forms part of the processor 112 and the memory 114 and is connected to the touch sensitive display 118. That is, the processor 112 controls by means of software instructions the fingerprint sensing system 100 as will be exemplified below. The touch sensitive display 118 is configured to act as the guidance information provider 108 by providing graphical output for a user during operation of the fingerprint sensing system 100. Needless to say, the processor 112 is configured to control the mobile communication device to operate in a mobile communication system via the radio circuitry 116 in a manner that is outside the scope of the present disclosure.

Yet another arrangement in which a fingerprint sensing system may be implemented is a smart card 140, as schematically illustrated in a functional block diagram in FIG. 1c. The smart card 140 comprises the functionalities of the fingerprint sensing system 100 of FIG. 1a including the sensor 104. The smart card 140 comprises a processor 142, a memory 144 and radio circuitry 146, which may be of any appropriate type such as near field communication, NFC, circuitry, Bluetooth® circuitry etc. As indicated in FIG. 1c, the fingerprint sensing system 100 forms part of the processor 142 and the memory 144. That is, the processor 142 controls by means of software instructions the fingerprint sensing system 100 as will be exemplified below. In contrast to the communication device 110 in FIG. 1b, the smart card is not equipped with a display, although variations of the smart card 140 may be equipped with a guidance information provider in the form of, e.g. light emitting diodes (LED) or audio providing means. Similar to the communication device 110 in FIG. 1b, the processor 142 in the smart card 140 is configured to control the smart card 140 to operate in a communication system, e.g. in a payment scenario in case the smart card is a bank card or credit card, via the radio circuitry 146 in a manner that is outside the scope of the present disclosure.

Turning now to FIG. 2a and with continued reference to FIGS. 1a, 1b and 1c, a method in a fingerprint sensing system, e.g. the fingerprint sensing system 100 of FIGS. 1a, 1b and 1c, will be described in some detail. The method comprises a number of actions that will be described below. The actions of the method in FIG. 2 are realized by means of software instructions being executed in a processor, e.g. any of the processors 102, 112 or the processor 142, which interacts with a sensor such as the sensor 104 and controls provision of guidance information, e.g. via a guidance information provider 108. Memory such as the memory 106 or the memory 114 is utilized during the execution of the method.

Action 201

A determination is made of a center of attention, COA, point. The COA point is a point on a finger of a user that is likely to be in a proximity of the center of a fingerprint image of the finger obtained by the sensor.

Action 203

The user is guided in a fingerprint enrolment procedure, using the determined COA point for providing finger position guidance information to the user.

Figure 2B:
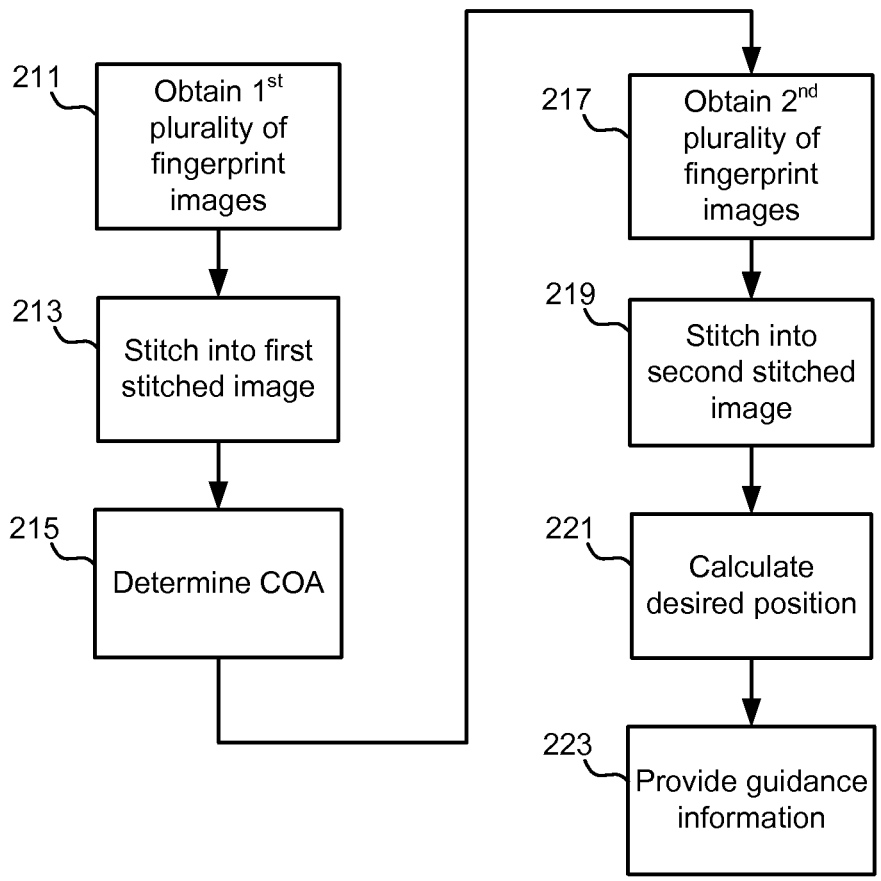
FIG. 2b is a flowchart of a method, FIG. 3 schematically illustrates a stitched image and a COA point, FIG. 4 schematically illustrates finger locations in relation to a sensor, and FIG. 5 schematically illustrates singular points in a fingerprint image.

Embodiments of the method illustrated in FIG. 2a may comprise actions as illustrated in FIG. 2b. Although the actions are illustrated in a sequential order, it is to be understood that any number of the actions may be performed in parallel, as will become clear from the detailed description of the actions. In these embodiments, the determination of the COA point, as described in action 201, comprises the following actions 211 to 215.

Action 211

A first plurality of fingerprint images of the finger of the user is obtained from the fingerprint sensor.

Action 213

During the obtaining of the first plurality of fingerprint images, the first plurality of fingerprint images are stitched into a first two-dimensional stitched image.

Action 215

The COA point is determined by calculating a center of gravity (COG) point of the first stitched image and assigning the center of gravity point to the COA point. The COG in the x and y direction, $CoG_x$ and $CoG_y$, may be calculated as:

$$CoG_x = \frac{\sum_{\forall x,y} xM(x,y)}{\sum_{\forall x,y} M(x,y)}, CoG_y = \frac{\sum_{\forall x,y} yM(x,y)}{\sum_{\forall x,y} M(x,y)}$$

where M(x,y) is a binary value coverage mask corresponding to the second stitched image with x and y being the pixel position in the second stitched image.

Figure 3:
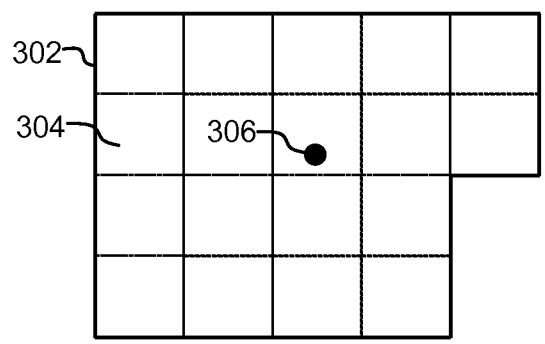
Figure 4:
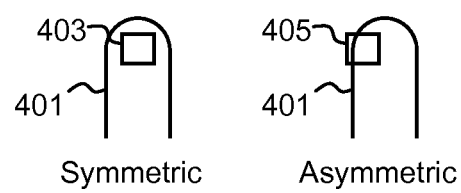

FIG. 3 illustrates an example of a plurality of fingerprint images, exemplified by reference numeral 304, have been stitched into a first stitched image 302. A calculated COA 306 is also indicated in FIG. 3.

In these embodiments, the guiding of the user in the fingerprint enrolment procedure, as described in action 203, comprises the following actions 217 to 223.

Action 217

A second plurality of fingerprint images of the finger of the user is obtained from the fingerprint sensor.

Action 219

During the obtaining of the second plurality of fingerprint images, the second plurality of fingerprint images are stitched into a second two-dimensional stitched image.

Action 221

During the obtaining and stitching of the second plurality of fingerprint images, a calculation is made of a desired position of the finger in relation to the sensor. This desired position is such that, when a fingerprint image in the second plurality of fingerprint images is obtained of the finger at the desired position provides an amount of additional fingerprint area in the second stitched image in the proximity of the COA point that has a maximum value.

Action 223

During the obtaining and stitching of the second plurality of fingerprint images, guidance information is provided for the user, where this guidance information is indicative of the calculated desired position. For example, the guidance information may be any of a matrix of blocks that illustrates the fingerprint coverage of the second stitched image, a binary map of actual coverage of the second stitched image, and a displayed image of a pseudo-finger that represents a position of the finger in relation to the sensor.

In some embodiments, prior to the obtaining of the first plurality of fingerprint images, i.e. before actions 211 to 215, instructions may be provided for the user to repeatedly touch the sensor while moving the finger between each touch. Such instructions may be as simple as an instructive message or graphic displayed on a display. In these embodiments, during the obtaining and stitching of the first plurality of fingerprint images, any obtained fingerprint image that corresponds to the finger being asymmetrically located with respect to the sensor is discarded. The continuation, in action 215, with the determination of the COA is then done when the first plurality of fingerprint images is numerically larger than a first threshold. In these embodiments, if an obtained fingerprint image is discarded, feedback information may be provided for the user that indicates that the finger is asymmetrically located with respect to the sensor. In other words, an advantage of such embodiments can be illustrated by considering a user who has little experience with fingerprint enrolment procedures. Such an inexperienced user might not be aware of how the amount of movement between each time the finger touches the sensor maps to the guidance information that is fed back to the user, e.g. in terms of fingerprint coverage growth etc. as mentioned above. This approach may be considered as a "training mode approach", since the user is informed when the user has placed the finger in an undesired asymmetric position in relation to the sensor and that a corresponding fingerprint image has been discarded.

In some embodiments, a determination may be made whether or not a fingerprint image corresponds to the finger being asymmetrically located with respect to the sensor. This determination may comprise analysing data of the fingerprint image that correspond to data obtained from a sensor border and determining that the finger is asymmetrically located with respect to the sensor if fingerprint image data is missing from the sensor border.

In some embodiments, prior to the obtaining of the first plurality of fingerprint images, i.e. before actions 211 to 215, instructions may be provided for the user to repeatedly touch the sensor while moving the finger between each touch. Such instructions may be as simple as an instructive message or graphic displayed on a display. In these embodiments, the continuation, in action 215, with the determination of the COA is then done when the first plurality of fingerprint images is numerically larger than a second threshold. In other words, such embodiments may be seen as a "training-free" approach where the COA is estimated once there are a minimum number of fingerprint images that can be stitched together.

Figure 5:

In some embodiments, the guiding of the user in the fingerprint enrolment procedure, i.e. in action 203, may comprise calculating an updated COA point by using the second stitched image. In these embodiments, a search is made, in the second stitched image, for a location of a singular point and, if the search is positive, the location of the singular point is used in the calculation of an updated COA point. Examples of singular points include a core, a loop, a whorl center, a delta and a tented arch. FIG. 5 illustrates a fingerprint 510 where singular points 507, 508 are illustrated. Singular point 507 is a delta and singular point 508 is a core point.

The embodiments where the COA is updated by using a location of a singular point may involve the following. The initial COA point might be sub-optimal since it is possible that the region in which the COA is located contains few recognizable fingerprint patterns. To incorporate a region that conveys a larger amount of recognizable patterns, global points (e.g. the location of a core, delta or loop) can be included in the estimation of COA. These patterns that comprise global points include high-informative regions and are hence useful to include as enrolment data. In order to include them, the initial COA is shifted, i.e. updated, to a point, $COA_{Upd}$, between the center of gravity (A) and a global point (B) according to the following expression:

$COA_{Upd} = (kA + (k-1)B)$ with $0 \leq k \leq 1$ as a weighting parameter.

In some embodiments, the amount of additional fingerprint area in the second stitched image is determined in an algorithm that comprises calculation of a coverage score S:

$S = \Sigma_{\forall x,y} G(CoA, \sigma) M(x,y)$ where G is a Gaussian kernel, σ is the standard deviation of the Gaussian and M(x,y) is a binary value coverage mask corresponding to the second stitched image with x and y being the pixel position in the second stitched image, and where the enrolment procedure is terminated when a termination criterion based on S is reached. The termination criterion may be any of a number of different criteria, including: S is above a coverage score threshold, the increase of S over a number N last fingerprint images obtained and stitched into the second stitched image, a number of fingerprint images in the second stitched image is above a third threshold, a number of consecutively obtained fingerprint images that are not possible to stitch into the second stitched image is above a fourth threshold, and a number of consecutively obtained fingerprint images that are found to have an image quality that is lower than a quality threshold is above a fifth threshold.

In other words, in these embodiments, during the calculation in action 221 of a desired finger position, the coverage score S summation is used in the following way: the Gaussian kernel having the COA as expected value and standard deviation σ and multiplied with the coverage mask M provides a measure of progress for the enrolment procedure. The key point is that the covered surface is weighted with a Gaussian kernel such that regions that are close to the COA are emphasized. This assures that the enrolment covers a region of the finger that will be used for subsequent verification and hence improves the biometric performance of the system. The coverage mask M(x,y) is a binary value mask that, for each point within the mask, shows whether the intensity of that pixel represents fingerprint-or background information.

Returning now to FIG. 1*a*, embodiments of a fingerprint sensing system 100 will be described in some more detail. FIG. 1*a* illustrates a fingerprint sensing system 100 that comprises a fingerprint sensor 104, a processor 102 and a memory 106, said memory 106 containing instructions executable by said processor 102 whereby said processor 102 is operative to control the fingerprint sensing system 100 by:
 determining a center of attention, COA, point, the COA point being a point on a finger of a user that is likely to be in a proximity of the center of a fingerprint image of the finger obtained by the sensor, and
 guiding the user in a fingerprint enrolment procedure, using the determined COA point for providing finger position guidance information to the user.

The instructions that are executable by the processor 102 may be software in the form of a computer program 141. The computer program 141 may be contained in or by a carrier 142, which may provide the computer program 141 to the memory 106 and processor 102. The carrier 142 may be in any suitable form including an electronic signal, an optical signal, a radio signal or a computer readable storage medium.

In some embodiments, the processor 102 is operative to control the fingerprint sensing system 100 by:
 obtaining a first plurality of fingerprint images of the finger of the user from the fingerprint sensor,
 stitching, during the obtaining of the first plurality of fingerprint images, the first plurality of fingerprint images into a first two-dimensional stitched image,
 determining the COA point by calculating a center of gravity point of the first stitched image and assigning the center of gravity point to the COA point, and wherein the guiding of the user in the fingerprint enrolment procedure comprises:
 obtaining a second plurality of fingerprint images of the finger of the user from the fingerprint sensor,
 stitching, during the obtaining of the second plurality of fingerprint images, the second plurality of fingerprint images into a second two-dimensional stitched image,
 calculating, during the obtaining and stitching of the second plurality of fingerprint images, a desired position of the finger in relation to the sensor that, when a fingerprint image in the second plurality of fingerprint images is obtained of the finger at the desired position provides an amount of additional fingerprint area in the second stitched image in the proximity of the COA point that has a maximum value, and
 providing, during the obtaining and stitching of the second plurality of fingerprint images, guidance information for the user, said guidance information being indicative of the calculated desired position.

In some embodiments, the processor 102 is operative to control the fingerprint sensing system 100 by, prior to the obtaining of the first plurality of fingerprint images:
 providing instructions for the user to repeatedly touch the sensor while moving the finger between each touch,
 discarding, during the obtaining and stitching of the first plurality of fingerprint images, any obtained fingerprint image that corresponds to the finger being asymmetrically located with respect to the sensor, and
 continuing with the determination of the COA point when the first plurality of fingerprint images is numerically larger than a first threshold.

In some embodiments, the processor 102 is operative to control the fingerprint sensing system 100 by:
 if an obtained fingerprint image is discarded, providing feedback information for the user that indicates that the finger is asymmetrically located with respect to the sensor.

In some embodiments, the processor 102 is operative to control the fingerprint sensing system 100 by:
 determining whether or not a fingerprint image corresponds to the finger being asymmetrically located with respect to the sensor, comprising:
 analysing data of the fingerprint image that correspond to data obtained from a sensor border and determining that the finger is asymmetrically located with respect to the sensor if fingerprint image data is missing from the sensor border.

In some embodiments, the processor 102 is operative to control the fingerprint sensing system 100 by, prior to the obtaining of the first plurality of fingerprint images:
 providing instructions for the user to touch the sensor while moving the finger between each touch, and continuing with the determination of the COA point when the first plurality of fingerprint images is numerically larger than a second threshold.

In some embodiments, the processor 102 is operative to control the fingerprint sensing system 100 such that the guiding of the user in the fingerprint enrolment procedure comprises:
 calculating an updated COA point by using the second stitched image.

In some embodiments, the processor 102 is operative to control the fingerprint sensing system 100 by:
 searching for, in the second stitched image, a location of a singular point and, if the search is positive, using the location of the singular point in the calculation of an updated COA point.

In some embodiments, the singular point is any of:
 a core,
 a loop,
 a whorl center,
 a delta, and
 a tented arch.

In some embodiments, the processor 102 is operative to control the fingerprint sensing system 100 such that the amount of additional fingerprint area in the second stitched image is determined in an algorithm that comprises calculation of a coverage score S:

$$S=\Sigma_{\forall x,y} G(\text{CoA},\sigma) M(x,y)$$

where G is a Gaussian kernel, σ is the standard deviation of the Gaussian kernel and M(x,y) is a binary value coverage mask corresponding to the second stitched image with x and y being the pixel position in the second stitched image, and where the enrolment procedure is terminated when a termination criterion based on S is reached.

In some embodiments, the processor 102 is operative to control the fingerprint sensing system 100 such that the termination criterion is any of:
 S is above a coverage score threshold,
 the increase of S over a number N last fingerprint images obtained and stitched into the second stitched image,
 a number of fingerprint images in the second stitched image is above a third threshold,
 a number of consecutively obtained fingerprint images that are not possible to stitch into the second stitched image is above a fourth threshold, and
 a number of consecutively obtained fingerprint images that are found to have an image quality that is lower than a quality threshold is above a fifth threshold.

In some embodiments, the processor 102 is operative to control the fingerprint sensing system 100 such that the guidance information is any of:
 a matrix of blocks that illustrates the fingerprint coverage of the second stitched image,
 a binary map of actual coverage of the second stitched image, and
 a displayed image of a pseudo-finger that represents a position of the finger in relation to the sensor.

What is claimed is:

1. A method in a fingerprint sensing system, the fingerprint sensing system comprising a fingerprint sensor, the method comprising:
 determining a center of attention, COA, point, the COA point being a point on a finger of a user that is likely to be in a proximity of the center of a fingerprint image of the finger obtained by the sensor, and
 guiding the user in a fingerprint enrolment procedure, using the determined COA point for providing finger position guidance information to the user,
 characterized in that the determination of the COA point comprises:
  obtaining a first plurality of fingerprint images of the finger of the user from the fingerprint sensor,
  stitching, during the obtaining of the first plurality of fingerprint images, the first plurality of fingerprint images into a first two-dimensional stitched image,
  determining the COA point by calculating a center of gravity point of the first stitched image and assigning the center of gravity point to the COA point, and
 wherein the guiding of the user in the fingerprint enrolment procedure comprises:
  obtaining a second plurality of fingerprint images of the finger of the user from the fingerprint sensor,
  stitching, during the obtaining of the second plurality of fingerprint images, the second plurality of fingerprint images into a second two-dimensional stitched image,
  calculating, during the obtaining and stitching of the second plurality of fingerprint images, a desired position of the finger in relation to the sensor that, when a fingerprint image in the second plurality of fingerprint images is obtained of the finger at the desired position provides an amount of additional fingerprint area in the second stitched image in the proximity of the COA point that has a maximum value in terms of a coverage score, S, and
  providing, during the obtaining and stitching of the second plurality of fingerprint images, guidance information for the user, said guidance information being indicative of the calculated desired position.

2. The method of claim 1, comprising, prior to the obtaining of the first plurality of fingerprint images:
 providing instructions for the user to repeatedly touch the sensor while moving the finger between each touch,
 discarding, during the obtaining and stitching of the first plurality of fingerprint images, any obtained fingerprint image that corresponds to the finger being asymmetrically located with respect to the sensor, and
 continuing with the determination of the COA point when the first plurality of fingerprint images is numerically larger than a first threshold.

3. The method of claim 2, comprising:
 if an obtained fingerprint image is discarded, providing feedback information for the user that indicates that the finger is asymmetrically located with respect to the sensor.

4. The method of claim 2, comprising:
 determining whether or not a fingerprint image corresponds to the finger being asymmetrically located with respect to the sensor, comprising:
  analysing data of the fingerprint image that correspond to data obtained from a sensor border and determining that the finger is asymmetrically located with respect to the sensor if fingerprint image data is missing from the sensor border.

5. The method of claim 1, comprising, prior to the obtaining of the first plurality of fingerprint images:
 providing instructions for the user to touch the sensor while moving the finger between each touch, and
 continuing with the determination of the COA point when the first plurality of fingerprint images is numerically larger than a second threshold.

6. The method of claim 1, wherein the guiding of the user in the fingerprint enrolment procedure comprises:
calculating an updated COA point by using the second stitched image.

7. The method of claim 6, comprising:
searching for, in the second stitched image, a location of a singular point and, if the search is positive, using the location of the singular point in the calculation of an updated COA point.

8. The method of claim 7, wherein the singular point is any of:
a core,
a loop,
a whorl center,
a delta, and
a tented arch.

9. The method of claim 1, wherein the coverage score S is determined by an algorithm that comprises:

$$S=\Sigma_{\forall x,y} G(CoA,\sigma)M(x,y)$$

where G is a Gaussian kernel, σ is the standard deviation of the Gaussian kernel and M(x,y) is a binary value coverage mask corresponding to the second stitched image with x and y being the pixel position in the second stitched image, and where the enrolment procedure is terminated when a termination criterion based on S is reached.

10. The method of claim 9, wherein the termination criterion is any of:
S is above a coverage score threshold,
the increase of S over a number N last fingerprint images obtained and stitched into the second stitched image,
a number of fingerprint images in the second stitched image is above a third threshold,
a number of consecutively obtained fingerprint images that are not possible to stitch into the second stitched image is above a fourth threshold, and
a number of consecutively obtained fingerprint images that are found to have an image quality that is lower than a quality threshold is above a fifth threshold.

11. The method of claim 1, wherein the guidance information is any of:
a matrix of blocks that illustrates the fingerprint coverage of the second stitched image,
a binary map of actual coverage of the second stitched image, and
a displayed image of a pseudo-finger that represents a position of the finger in relation to the sensor.

12. A fingerprint sensing system, comprising a fingerprint sensor, a processor and a memory, said memory containing instructions executable by said processor whereby said processor is operative to control the fingerprint sensing system by:
determining a center of attention, COA, point, the COA point being a point on a finger of a user that is likely to be in a proximity of the center of a fingerprint image of the finger obtained by the sensor, and
guiding the user in a fingerprint enrolment procedure, using the determined COA point for providing finger position guidance information to the user,
characterized in that the determination of the COA point comprises:
obtaining a first plurality of fingerprint images of the finger of the user from the fingerprint sensor,
stitching, during the obtaining of the first plurality of fingerprint images, the first plurality of fingerprint images into a first two-dimensional stitched image,
determining the COA point by calculating a center of gravity point of the first stitched image and assigning the center of gravity point to the COA point, and
wherein the guiding of the user in the fingerprint enrolment procedure comprises:
obtaining a second plurality of fingerprint images of the finger of the user from the fingerprint sensor,
stitching, during the obtaining of the second plurality of fingerprint images, the second plurality of fingerprint images into a second two-dimensional stitched image,
calculating, during the obtaining and stitching of the second plurality of fingerprint images, a desired position of the finger in relation to the sensor that, when a fingerprint image in the second plurality of fingerprint images is obtained of the finger at the desired position provides an amount of additional fingerprint area in the second stitched image in the proximity of the COA point that has a maximum value in terms of a coverage score, S, and
providing, during the obtaining and stitching of the second plurality of fingerprint images, guidance information for the user, said guidance information being indicative of the calculated desired position.

13. A communication device comprising the fingerprint sensing system of claim 12 and a touch sensitive display.

14. A non-transitory computer readable storage medium having a plurality of instructions stored thereon, which, when executed by one or more processors, cause the one or more processors to perform operations comprising:
determining a center of attention, COA, point, the COA point being a point on a finger of a user that is likely to be in a proximity of the center of a fingerprint image of the finger obtained by the sensor, and
guiding the user in a fingerprint enrolment procedure, using the determined COA point for providing finger position guidance information to the user,
characterized in that the determination of the COA point comprises:
obtaining a first plurality of fingerprint images of the finger of the user from the fingerprint sensor,
stitching, during the obtaining of the first plurality of fingerprint images, the first plurality of fingerprint images into a first two-dimensional stitched image,
determining the COA point by calculating a center of gravity point of the first stitched image and assigning the center of gravity point to the COA point, and
wherein the guiding of the user in the fingerprint enrolment procedure comprises:
obtaining a second plurality of fingerprint images of the finger of the user from the fingerprint sensor,
stitching, during the obtaining of the second plurality of fingerprint images, the second plurality of fingerprint images into a second two-dimensional stitched image,
calculating, during the obtaining and stitching of the second plurality of fingerprint images, a desired position of the finger in relation to the sensor that, when a fingerprint image in the second plurality of fingerprint images is obtained of the finger at the desired position provides an amount of additional fingerprint area in the second stitched image in the proximity of the COA point that has a maximum value in terms of a coverage score, S, and
providing, during the obtaining and stitching of the second plurality of fingerprint images, guidance information for the user, said guidance information being indicative of the calculated desired position.

* * * * *